R. H. SMITH.
SIGN PROJECTOR.
APPLICATION FILED JUNE 26, 1918.
1,332,999.
Patented Mar. 9, 1920.
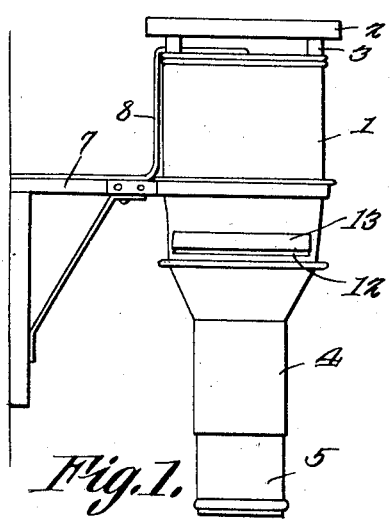
Fig. 1.
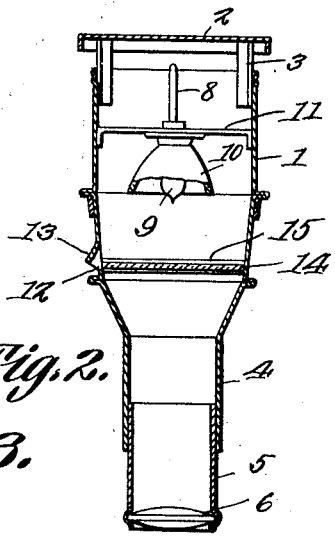
Fig. 2.
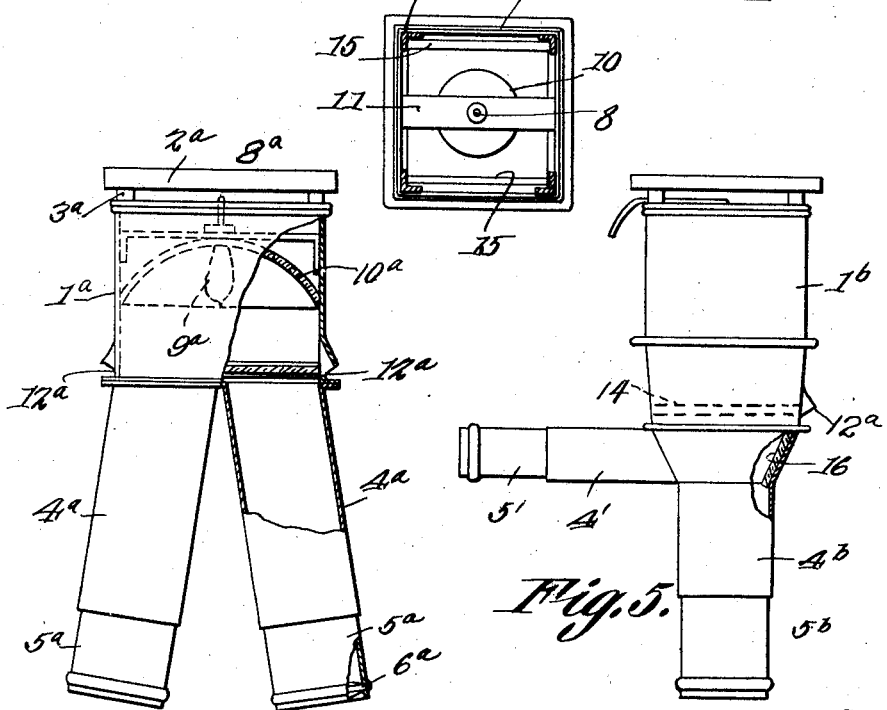
Fig. 3.
Fig. 4.
Fig. 5.
Witness
Inventor,
R. H. Smith
By C. A. Snow & Co.
Attorneys.

UNITED STATES PATENT OFFICE.

ROBERT H. SMITH, OF HENDERSONVILLE, NORTH CAROLINA.

SIGN-PROJECTOR.

1,332,999.　　　　　Specification of Letters Patent.　　Patented Mar. 9, 1920.

Application filed June 26, 1918. Serial No. 242,041.

*To all whom it may concern:*

Be it known that I, ROBERT H. SMITH, a citizen of the United States, residing at Hendersonville, in the county of Henderson and State of North Carolina, have invented a new and useful Sign-Projector, of which the following is a specification.

The subject of this invention is a sign projector intended for use in projecting an advertisement on the sidewalk or other easily seen position.

The main object of the invention is the provision of means for holding a slide in proper position.

Another object of the invention is the provision of means for focusing rays of light.

A still further object of the invention is the provision of means for protecting the parts from the weather.

The invention also contemplates generally improving the construction and enhancing the utility of sign projectors.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawing, wherein:—

Figure 1 is a view in side elevation of a projector constructed in accordance with the invention;

Fig. 2 is a similar view partly in section;

Fig. 3 is a plan view with the cover removed;

Fig. 4 is a view in elevation, partly in section of a modified form of the device;

Fig. 5 is a similar view of a still further modification.

In carrying out the invention there is provided a suitable casing 1, herein shown as of rectangular cross section, formed of any convenient material such as galvanized iron. This casing is open at the top and has a shed or cover 2 held in spaced relation thereto by legs or supports 3. The cover 2 is of greater area than the cross sectional area of the casing, and is formed with a peripheral apron to aid in shedding water, the cover being provided for the purpose of protecting the interior of the casing from the weather.

The casing 1 merges, at its lower end, into a depending tubular portion or nipple 4 in which a tubular section 5 has a close sliding fit and below which the section 5 projects. The tubular section 5 is swaged, near its lower end, to form a groove for the reception of the periphery of a lens 6. As will be evident, the sections 5 may be slid up or down to properly focus rays of light passing through the lens 6.

The casing may be hung from the side of a building or other suitable support by a bracket arm 7, and a cable 8 may supply current to an electric lamp 9 which is hung within the casing 1, and located within a reflector 10. A cross bar 11 may be provided in the casing 1 for the purpose of supporting the cable and lamp.

A slot 12 is formed in one side of the casing 1, near the lower end of the casing, and this slot is overhung by a sloping protecting strip 13 which serves to keep rain and snow from driving into the slot. This slot is provided to permit a slide 14 to be inserted into the casing, guide strips or flanges 15 being provided within the casing to retain the slide.

In the modification shown in Fig. 4 the casing $1^a$ is covered by the roof $2^a$ which is supported in spaced relation to the casing by the legs $3^a$. The casing merges, at its lower end into branch tubes $4^a$ from which project and in which slide the tubular sections $5^a$. The sections $5^a$ have lenses $6^a$ secured therein.

An electric lamp $9^a$, located within a reflector $10^a$ is supported within the casing, a cross bar $11^a$ being provided for this purpose. A cable $8^a$ may supply current to the lamp $9^a$.

Two slots $12^a$ are provided to hold slides in position above each tube $4^a$, the purpose being to project two signs at the same time, or to project duplicates of the same sign, the position of the signs being reversed so that the same may be read by one approaching from either direction.

In the modification shown in Fig. 5 a similar casing is provided, indicated by the numeral $1^b$, and this casing has, in addition to the depending tube $4^b$, a laterally projecting tube $4'$ in which slides the tubular section $5'$. Rays of light are directed through the tubes 4' and 5' by means of an inclined mirror 16 which may be supported in any suitable manner within the casing 1ᵇ. The branch tubes 4' and 5' are provided for the purpose of projecting a sign upon the side wall of a building or the like while at the same time projecting the sign through the tubes 4ᵇ and 5ᵇ upon the sidewalk.

It is, of course, understood that the device is intended for use in projecting advertising signs, though capable of other uses.

Having thus described the invention, what is claimed as new and sought by Letters Patent, is:—

1. A sign projector including a casing constituting a lamp housing, a cover spaced from and extending beyond the wall of the upper end of the casing, said casing having a slot in the wall thereof, a transverse slide support within the casing and communicating with the slot, said slot and slide support being adapted to receive a removable slide having an image, a lamp within the housing and above the slide support, a downwardly extending lens tube for receiving light rays passing through the slide from the lamp, a lens tube extending at an angle from the housing and below the slide support, and reflecting means for deflecting the image from the slide and into said last named tube.

2. A sign projector including a casing constituting a lamp housing, said casing having a slot in the wall thereof, a transverse slide support within the casing and extending from the slot, a lamp within the housing and above the slide support, separate tubes extending from the casing for receiving light rays from the lamp, a lens within each tube, and means within the casing for deflecting light from the lamp toward one of the tubes.

3. A sign projector including a casing constituting a lamp housing, said casing having a slot in the wall thereof, a transverse slide support within the casing and extending from the slot, a lamp in the housing and above the slide support, a downwardly extending lens tube extending from the casing below said support, a laterally extending lens tube projecting from the housing below said support, said downwardly extending tube being in position to receive the direct rays from the lamp, and a light deflector for directing rays from the lamp to the laterally extending tube.

In testimony that I claim the foregoing as my own, I have hereto affixed my signature in the presence of two witnesses.

ROBERT H. SMITH.

Witnesses:
J. L. ROSE,
W. R. WHITMORE, Jr.